US012609956B2

(12) United States Patent
Foulks et al.

(10) Patent No.: US 12,609,956 B2
(45) Date of Patent: Apr. 21, 2026

(54) SECURITY INFORMATION CAPTURE AND DISTRIBUTION

(71) Applicant: Wells Fargo Bank, N.A., San Francisco, CA (US)

(72) Inventors: Todd Michael Foulks, Harrisburg, NC (US); Patrick Kelly O'Donnell, Denver, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 152 days.

(21) Appl. No.: 18/476,488

(22) Filed: Sep. 28, 2023

(65) Prior Publication Data

US 2024/0121260 A1 Apr. 11, 2024

Related U.S. Application Data

(60) Provisional application No. 63/379,088, filed on Oct. 11, 2022.

(51) Int. Cl.
*H04L 9/00* (2022.01)
*H04L 9/40* (2022.01)
(52) U.S. Cl.
CPC ................................ *H04L 63/1433* (2013.01)
(58) Field of Classification Search
CPC .................................................... H04L 63/1433
USPC .......................................................... 726/25
See application file for complete search history.

(56) References Cited

U.S. PATENT DOCUMENTS

| | | | | |
|---|---|---|---|---|
| 6,185,689 B1 * | 2/2001 | Todd, Sr. | ................ | H04L 67/53 |
| | | | | 709/228 |
| 2006/0075503 A1 * | 4/2006 | Bunker | ................. | G06F 21/577 |
| | | | | 726/1 |
| 2021/0344703 A1 * | 11/2021 | Barajas | ............... | G06F 16/2379 |
| 2021/0367961 A1 * | 11/2021 | Kuppa | ................. | G06F 40/205 |
| 2023/0319062 A1 * | 10/2023 | Bushey | ............... | H04L 63/1416 |
| | | | | 726/23 |

OTHER PUBLICATIONS

PlexTrac, "Automate Your Pentest Planning, Reporting, and Findings Delivery with PlexTrac," https://plextrac.com/, copyright 2023, 8 pages.
The MITRE Corporation, "ATT&CK Matrix for Enterprise," https://attack.mitre.org/, copyright 2015-2023, 2 pages.
IBM, "IBM OpenPages: Simplify how you manage risk and regulatory compliance with a unified GRC platform fueled by AI and all your data," https://www.ibm.com/products/openpages, accessed Sep. 28, 2023, 13 pages.

* cited by examiner

*Primary Examiner* — Christopher J Brown
(74) *Attorney, Agent, or Firm* — Merchant & Gould P.C.

(57) ABSTRACT

An example computer system for capturing security information can include: one or more processors; and non-transitory computer-readable storage media encoding instructions which, when executed by the one or more processors, causes the computer system to create: a dashboard engine programmed to generate a dashboard with the security information thereon; a remediation engine programmed to track remediation of one or more security vulnerabilities; and a report generator engine programmed to generate a report including the security information and the one or more security vulnerabilities, wherein dissemination of the report is controlled.

8 Claims, 4 Drawing Sheets

112

TTP library engine
202

Workbench engine
204

Dashboard engine
206

Remediation / validation engine
208

Report generator / viewer engine
210

Administration engine
212

Extraction engine
214

302 — Dashboard for LOB A

304 — Outstanding security issues:

1. Security issue one – status
2. Security issue two – status
3. Security issue three – status

...

X. Security issue X - status

306 — Heat map

Product 1          Product 2          Product 3

Issue 1

Issue 2

Issue 3

SECURITY INFORMATION CAPTURE AND DISTRIBUTION

BACKGROUND

Cybersecurity can be a primary concern for an entity. There are various ways the entity can monitor its security. One technique is to utilize a "red team" that mimics the role of a nefarious actor who tests the security of the entity. The results of the red team's effort can be used to measure the entity's current Cybersecurity readiness and provide feedback on enhancements to that security.

SUMMARY

Examples provided herein are directed to the capture and distribution of security information.

According to one aspect, an example computer system for capturing security information can include: one or more processors; and non-transitory computer-readable storage media encoding instructions which, when executed by the one or more processors, causes the computer system to create: a dashboard engine programmed to generate a dashboard with the security information thereon; a remediation engine programmed to track remediation of one or more security vulnerabilities; and a report generator engine programmed to generate a report including the security information and the one or more security vulnerabilities, wherein dissemination of the report is controlled.

According to another aspect, an example method for capturing security information can include: generating a dashboard with the security information thereon; tracking remediation of one or more security vulnerabilities; and generating a report including the security information and the one or more security vulnerabilities, wherein dissemination of the report is controlled.

The details of one or more techniques are set forth in the accompanying drawings and the description below. Other features, objects, and advantages of these techniques will be apparent from the description, drawings, and claims.

DESCRIPTION OF THE DRAWINGS

FIG. 2 shows example logical components of a server device of the system of FIG. 1.

DETAILED DESCRIPTION

This disclosure relates to the capture and distribution of security information.

In the examples provided herein, security information for an entity is captured and distributed in a manner in which such information can be controlled and validated. The information can include cybersecurity information related to vulnerabilities associated with the entity.

There can be various advantages associated with the technologies described herein. For instance, the disclosed technologies result in the practical application of capturing and distributing cybersecurity information in a manner that is efficient and secure. This can be important, as the information can be highly sensitive, including data regarding vulnerabilities to certain attacks. By controlling the capture and dissemination of this information, such vulnerabilities can be addressed without compromising the integrity of the entity.

Figure 1:
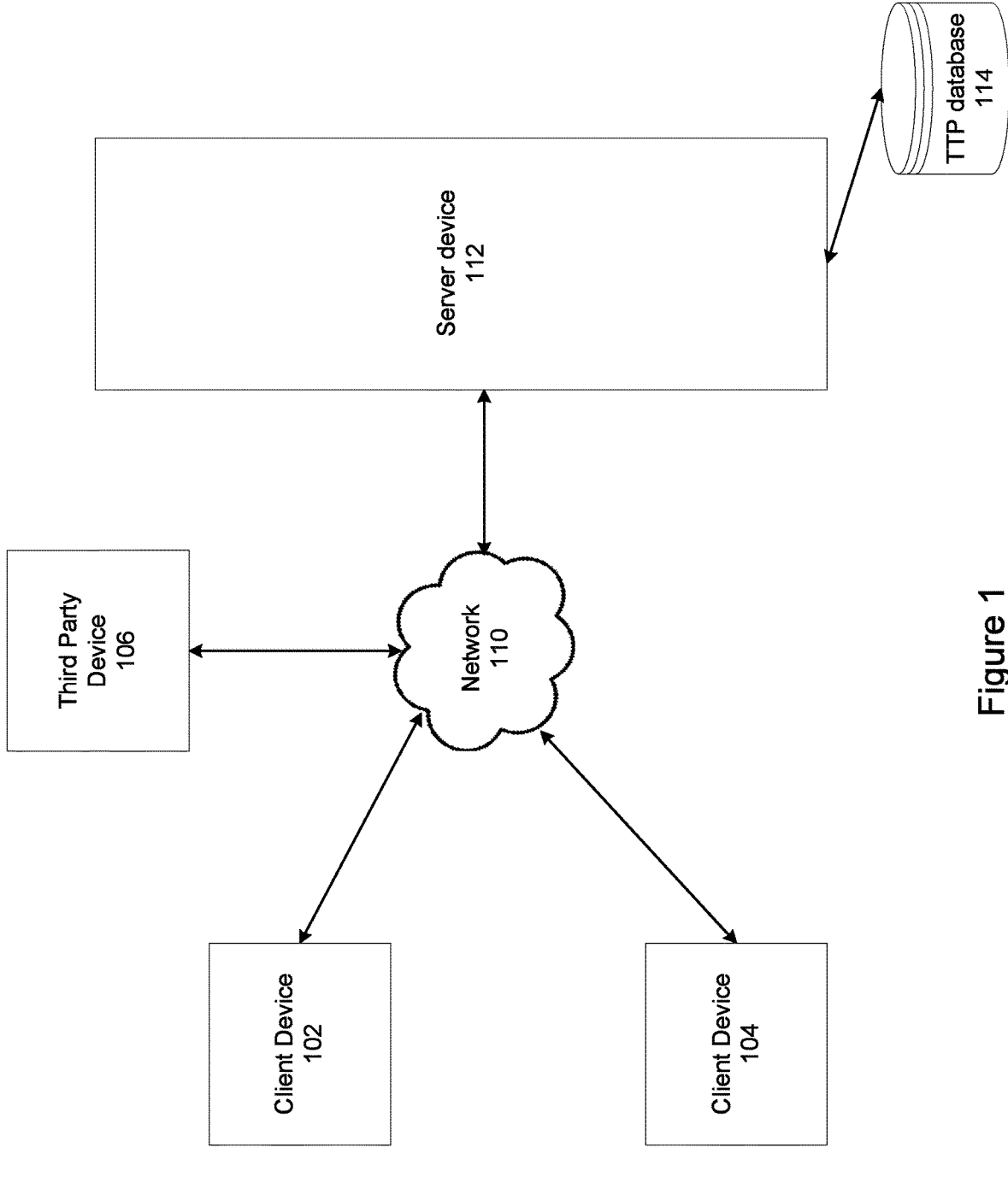
FIG. 1 shows an example system for capturing and distributing security information.

FIG. 1 schematically shows aspects of one example system 100 programmed to capture and distribute security information. In this example, the system 100 can be a computing environment that includes a plurality of client and server devices. In this instance, the system 100 includes client devices 102, 104, a third party device 106, a server device 112, and a Tactics, Techniques, and Procedures (TTP) database 114. The client devices 102, 104 and the third party device 106 can communicate with the server device 112 through a network 110 to accomplish the functionality described herein.

Each of the devices may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server device 112 is owned by a financial institution, such as a bank. The client devices 102, 104 and the third party device 106 can be programmed to communicate with the server device 112 to capture and distribute security information. Many other configurations are possible.

For instance, the client device 102 can be a device used to assess the security of the financial institution, including the server device 112. In such an example, the client device 102 can be part of a "red team" that tests the security of the financial institution. The red team can be affiliated with the financial institution and be used to provide security information to the financial institution. In such an example, the client device 102 is used to assess exploits associated with the security of the financial institution and then report any vulnerabilities associated with those exploits.

The client device 104 can be used to access security information from the server device 112. In one example, the client device 104 can be used to access information associated with the activities of the red team, such as security vulnerabilities for the financial institution. The client device 104 can be further programmed to access the server device 112 to track and mitigate any security issues identified by the red team. As described further below, the client device 104 can, for instance, access security dashboards and reports.

The third party device 106 can be programmed to provide security information. In some examples, the third party device 106 is owned by a third party (although, in other implementations, the third party can be part of or otherwise affiliated with the financial institution). The third party device 106 is, in this instance, a third party that provides information about security exploits.

One example of such a third party is MITRE ATT&CK®, which is a globally-accessible knowledge base of adversary tactics and techniques based on real-world observations. In such an example, the server device 112 can be programmed to access information about the tactics and techniques from the third party device 106. This information can be used to assist the red team when testing the security of the financial institution. The information can also be used to track the identification and mitigation of security vulnerabilities for the financial institution.

There are many different types of security vulnerabilities that can be accessed, tested, and/or mitigated. Examples of techniques that can be used to test security vulnerabilities include, without limitation: reconnaissance techniques (e.g., active scanning, phishing for information); initial access (e.g., drive-by compromise, phishing, supply chain compromise); execution (e.g., deploy container, user execution); credential access (e.g., brute force, input capture); lateral movement (e.g., internal spearphishing, remote services); and collection (e.g., browser session hijacking, data from information repositories). Many other techniques can also be used.

In some examples, the server device 112 stores TTP information in the TTP database 114. The TTP database 114 can store TTP information from both internal information associated with the entity, along with external information, such as that provided by the third party device 106.

In example embodiments, the TTP database 114 can be programmed to create a library of TTP information from which data can be pulled by the server device 112. As described further below, the red team and others can use the library to access such information, as well as annotate the information. For instance, certain TTPs in the TTP database 114 can be flagged and annotated based upon the relevance to the financial institution.

In the present example, the server device 112 is programmed to capture and distribute security information. For instance, the server device 112 can facilitate the testing of any security vulnerabilities associated with the systems of the financial institution. This testing can be conducted, for instance, by the red team and/or other parties designed by the financial institution.

The network 110 provides a wired and/or wireless connection between the client devices 102, 104, 106 and the server device 112. In some examples, the network 110 can be a local area network, a wide area network, the Internet, or a mixture thereof. Many different communication protocols can be used. Although only three devices are shown, the system 100 can accommodate hundreds, thousands, or more of computing devices.

Referring now to FIG. 2, additional details of the server device 112 are shown. In this example, the server device 112 has various logical modules that assist in capturing and distributing security information. The server device 112 can, in this instance, include a TTP library engine 202, a workbench engine 204, a dashboard engine 206, a remediation/validation engine 208, a report generator/viewer engine 210, an administration engine 212, and an extraction engine 214. In other examples, more or fewer engines providing different functionality can be used.

The example TTP library engine 202 is programmed to capture and provide information regarding tactics, techniques, and procedures for the red team and others assessing the security vulnerabilities for the financial institution. As noted, the TTP library engine 202 can store both internal and external threat information in the TTP database 114.

For instance, the TTP library engine 202 allows members of the red team to access tactics, techniques, and procedures, with the ability to add and to link to findings in a common data store in the TTP database 114. This information can be flagged as available for internal or external data availability.

For external security information, the TTP library engine 202 is programmed to access tactics, techniques, and procedures from one or more third parties, such as the third party device 106, using an Application Programming Interface (API). In one example, the TTP library engine 202 is programmed to automatically access tactics, techniques, and procedures and other security information from a third party, such as MITRE ATT&CK®, through an API and store this security information in the TTP database 114.

Further, the TTP library engine 202 manages annotation of this security information within the TTP database 114. For instance, as described further below, the TTP library engine 202 allows the security information to be annotated with respect to specific aspects of the financial institution and bad actors.

The example workbench engine 204 is programmed to allow the red team and others associated with the financial institution to use the client device 104 to define a body of work and to track findings and observations relating to security information. In some examples, the workbench engine 204 allows members of the red team to perform assessments of the cybersecurity for the financial institution.

In one example, the workbench engine 204 defines information about the assessments for the financial institution. For example, the red team can perform various assessments to test the security of the financial institution. The red team accesses the workbench engine 204 on the client device 104 to create, track, document, and/or reproduce those assessments.

As an example, the red team can pose as a specific threat actor and use tactics typical for that actor to test the security of the financial institution. An example assessment can include a complete attack chain, starting with the ability to access the desired environment of the financial institution and then possibly mimic an attack on the environment once compromised.

In some examples, the workbench engine 204 is programmed to capture metadata about the assessment, including items such as participants and scoping, and possibly more detailed information about observations and findings that allow the assessment to be reviewed and replicated, if desired. The workbench engine 204 can allow the participants of the assessment to access tactics, techniques, and procedures from the TTP database 114 as the participants plan and implement the attack. For instance, the workbench engine 204 allows the participants to access specifics about a mode of attack common for a bad actor (e.g., phishing or social engineering) and use that mode of attack to test the security of the financial institution.

The workbench engine 204 also allows the participants of the assessment to score the security of the financial institution during the attack. This scoring mechanism can be tied to the TTP database 114 and allow the participant to provide feedback on possible remediation/mitigation options. In this example, the workbench engine 204 can be programmed to capture rich text from the participants about the assessment and possible remediation efforts. This can include accommodating in-line screen captures and allow for file attachments and tables to illustrate the exploits and other security information associated with the assessment. The workbench engine 204 can be further programmed to provide review comments and track changes as different participants annotate and review the results of the assessment.

The example dashboard engine 206 is programmed to display security information for a user, such as the client device 104. The security information can include, without limitation, information about the state of security for the entity. For instance, the dashboard engine 206 can be programmed to provide up-to-date information relating to security vulnerabilities for the entity, along with remediation efforts for the same.

In some examples, the dashboard engine 206 tailors the display of the security information based upon the role of the user of the client device 104. This allows the dashboard engine 206 to provide security information at the level of sophistication and relevance for the user of the client device 104. Examples of such role-based dashboards created by the dashboard engine 206 can include:

Administrators—dashboards to monitor the status of on-going activity, reports, and findings;

Customer—dashboards to show findings that relate to the user's line of business along with the statuses;

Researcher—dashboards to show reports and findings on which they are participants;

Leadership—dashboards summarize the work being done for the entity; and

Direct Management—to monitor the work activity at the team/assessment/researcher level to help monitor, manage and direct resources.

Many other types of dashboards are possible.

In some examples, the dashboard engine 206 can also create a TTP heatmap, which is based on factual data obtained from the third party device 106. In such an example, the TTP heatmap can be used to show gaps or coverage for various security vulnerabilities associated with the entity, as described further below.

Figure 3:
FIG. 3 shows an example user interface generated by the server device of FIG. 2.

Referring now to FIG. 3, an example dashboard 300 is shown that can be generated by the dashboard engine 206. In this example, a title block 302 identifies the dashboard 300 as being related to security information for a particular line of business "A". A block 304 lists the outstanding security issues associated with the line of business. In some examples, the security issues are listed in a specified order (e.g., newest first, most important first, etc.), with each of the security issues being selectable to obtain further information about the issue, such as status, products impacted, etc.

In addition, the dashboard 300 includes an example heat map 306. This heat map 306 visually depicts security issues that span across the products associated with the line of business A. In this example, the security issues 1-3 are depicted in a manner that visually indicates the applicability and importance of the issues. For instance, Issue 1 is positioned to impact Product 1, while Issue 2 spans both Products 1 and 2. Similarly, a size of the issues depicted on the heat map 306 indicates the relative importance or impact of the issues. For instance, the size of Issue 2 is larger than that of Issue 1 to indicate a relative importance of Issue 2. Other visual indicators, such as color, can also be used. Other aspects, such as the length of the boxes for the issues, could be used to visually signify aspects, such as the length of time each issue has been known or time to address each issue. Many configurations are possible.

In these examples, the dashboard engine 206 allows a user to drill down on the security information shown on the dashboard to understand the information from multiple perspectives. For instance, a researcher is able to select a particular vulnerability to obtain information about the vulnerability itself, along with line of businesses or other aspects of the entity which may be susceptible and/or protected from such a vulnerability. Many configurations are possible.

The example remediation/validation engine 208 is programmed to provide an interface that allows participants (who have been granted access at a specified level) to see information associated with remediation and validation efforts associated with the financial institution. This can include, without limitation, basic information about the assessment and remediation activity.

In one example, the remediation/validation engine 208 is provided with workflow capabilities to track and manage remediation efforts when a security vulnerability is identified. For example, when the assessment indicates that the financial institution has a specific security vulnerability, the remediation/validation engine 208 tracks the vulnerability and efforts to remediate it. This can include, for instance, the capture of what has been done to remediate the vulnerability, along with validation testing. For example, the remediation/validation engine 208 can allow validation testers to enter information about the work that is done to validate the findings from the assessment and capture the efficacy of remediation efforts.

In some examples, the remediation/validation engine 208 tracks the entire lifecycle of a security vulnerability, from identification to confirmation of remediation. The lifecycle can be accessed by different participants, such as members of the red team, validation testers, and participants from the relevant line of business. The remediation/validation engine 208 can indicate the status of the security vulnerability (e.g., open or closed) and also function, through the workflow, to initiate various actions. For example, once remediation is completed, the remediation/validation engine 208 can be programmed to automatically initiate a validation effort before the security vulnerability is closed. Many configurations are possible.

The example report generator/viewer engine 210 is programmed to render one or more reports associated with the assessment. In some examples, the report generator/viewer engine 210 is programmed to create a report, such as a Portable Document Format (PDF) report, using information from the remediation/validation engine 208 to summarize the vulnerabilities associated with parts or all of the financial institution.

In one example, the report generator/viewer engine 210 can customize the report based upon input and/or the parties who will consume the report. For example, the report generator/viewer engine 210 can customize the information in the report and the order in which information is presented, such as to insert information (e.g., boilerplate) at desired places. Examples of such reports include, without limitation:

Full Rollup Report—report that captures all security vulnerabilities for the financial institution (or a part thereof, such as a line of business);

Vendor (Redacted) Report—report that captures specific aspects of security vulnerabilities for consumption by third parties, such as vendors; such reports can have sensitive information redacted;

Executive Briefing—reports tailored to provide briefing information to, for instance, executives of the financial institution; and Baseball Card Style—reports tailored to provide information in a visually-efficient manner, such as by providing vulnerabilities in boxes organized for easy and quick consumption.

Report customization can be performed by developers or, optionally, tools can be provided to allow for participants to customer reports as needed.

The reports generated by the report generator/viewer engine 210 can include highly-sensitive and contain confidential information. For instance, the reports can provide details about security vulnerabilities for the financial institution, including possibly information that would allow a bad actor to exploit those security vulnerabilities. Because of this, the report generator/viewer engine 210 can be programmed to control access to any reports created by the report generator/viewer engine 210.

In some examples, access is defined manually by whomever generates the report. In other examples, the report generator/viewer engine 210 is programmed to automatically limit access to the report using various mechanisms. For example, in one embodiment, the report can only be accessed using a viewer that is generated by the report generator/viewer engine 210. For instance, the viewer can use an API to access the report after providing proper authentication. The report cannot be stored or forwarded.

Further, the report generator/viewer engine 210 can be programmed to provide additional security mechanisms for any reports, such as encryption of the reports. In some examples, the report generator/viewer engine 210 can also provide document rights management (DRM)-type limitations on the report. These DRM-type limitations can dictate who can access, read, and forward the report. The DRM-type limitations provide location-based limits where the report can be accessed (e.g., defining a geo-fence using GPS), provide time-based limitations on access, watermarking, and even result in destruction of the report after a given period of time or when certain parameters are met.

For example, the report generator/viewer engine 210 can generate a report that is only accessible by certain individuals (such as an individual at a line of business for the financial institution) from a particular location, such as the premises of the financial institution. Further, the report can be programmed to self-destruct after a given period of time, such as an hour. In this manner, the risk of the report being accessed or otherwise disseminated is reduced. Many configurations are possible.

The example administration engine 212 is programmed to manage administrative aspects of the server device 112 of the system 100. In this example, this can include managing access (e.g., authentication and authorization) to such components as the workbench engine 204, the dashboard engine 206, the remediation/validation engine 208, and the report generator/viewer engine 210.

For instance, the administration engine 212 can be used to grant and deny access to reports that are generated by the report generator/viewer engine 210. This includes the report generator/viewer engine 210 providing role-based access to controls of the server device 112. In addition, the report generator/viewer engine 210 is programmed to provide fault-administration, which includes removal of rights at appropriate times. For example, when individuals move to other responsibilities, the report generator/viewer engine 210 can automatically revoke credentials for the server device 112. In other instance, the report generator/viewer engine 210 can be programmed to provide bulk changes to user authorizations.

In this example, all activity associated with access to reports and other aspects of the system 100 can be logged by the administration engine 212 for auditing purposes. This includes logging access to the server device 112, as well as logging access to reports and changes made using the workbench engine 204, the dashboard engine 206, and/or the remediation/validation engine 208.

The example extraction engine 214 is programmed to query the TTP database 114 to extract relevant data for use by the server device 112. In some examples, the data can be accessed (e.g., using SQL or similar constructs) by the extraction engine 214 for inclusion in the reports generated by the report generator/viewer engine 210. In other examples, the extraction engine 214 allows for searching or extraction of data by relevant parties, such as the red team, line of business participants, etc. Such access is conditioned on proper authentication and authorization. The extractions can be made on various criteria, such as vulnerability type, line of business, date range, etc. Many configurations are possible.

Figure 4:
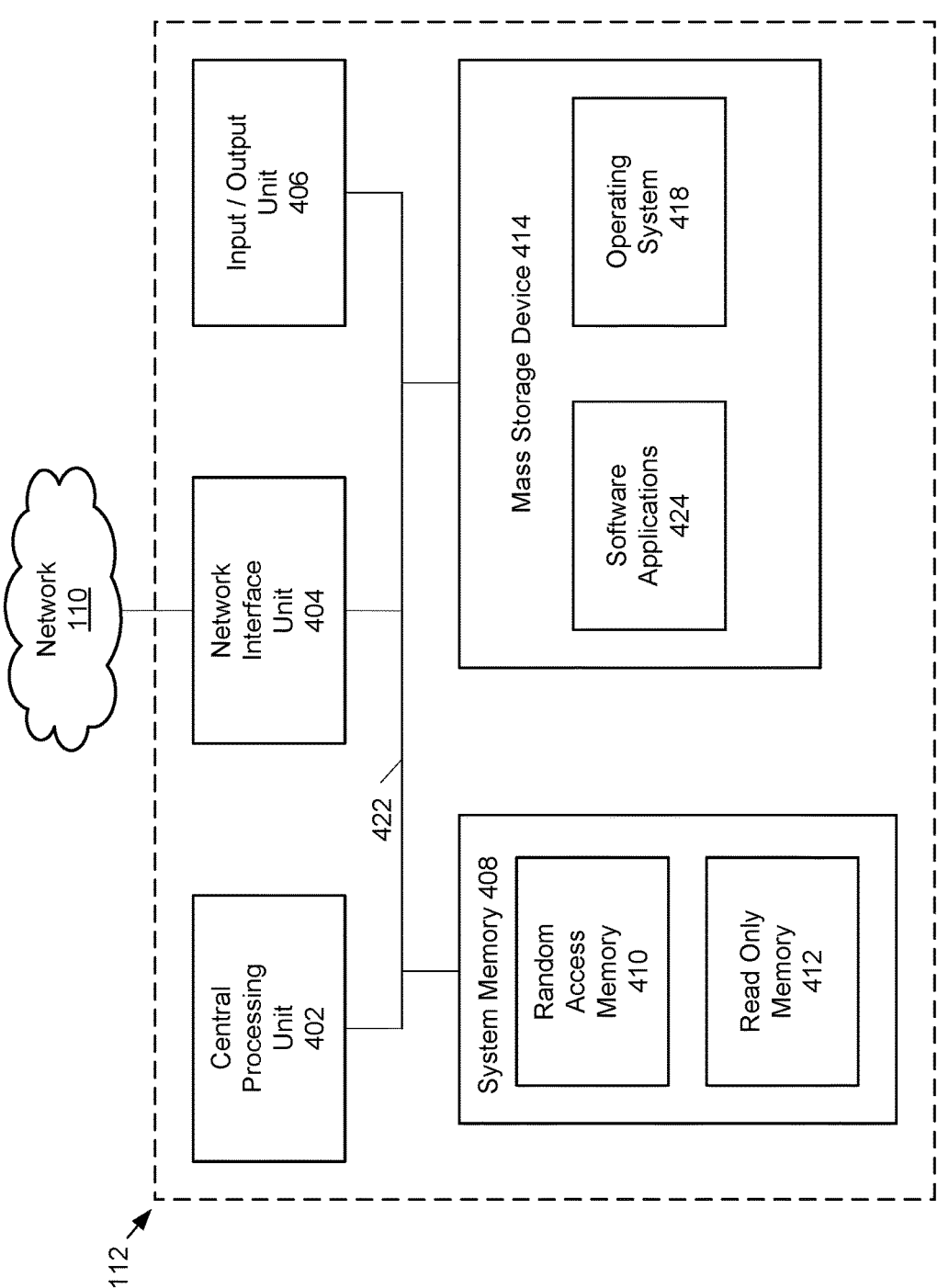
FIG. 4 shows example physical components of the server device of FIG. 2.

As illustrated in the embodiment of FIG. 4, the example server device 112, which provides the functionality described herein, can include at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system containing the basic routines that help transfer information between elements within the server device 112, such as during startup, is stored in the ROM 412. The server device 112 further includes a mass storage device 414. The mass storage device 414 can store software instructions and data. A central processing unit, system memory, and mass storage device similar to that shown can also be included in the other computing devices disclosed herein.

The mass storage device 414 is connected to the CPU 402 through a mass storage controller (not shown) connected to the system bus 422. The mass storage device 414 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 404 connected to the system bus 422. It should be appreciated that the network interface unit 404 may also be utilized to connect to other types of networks and remote computing systems. The server device 112 also includes an input/output controller 406 for receiving and processing input from a number of other devices, including a touch user interface display screen or another type of input device. Similarly, the input/output controller 406 may provide output to a touch user interface display screen or other output devices.

As mentioned briefly above, the mass storage device 414 and the RAM 410 of the server device 112 can store software instructions and data. The software instructions include an operating system 418 suitable for controlling the operation of the server device 112. The mass storage device 414 and/or the RAM 410 also store software instructions and applications 424, that when executed by the CPU 402, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for capturing security information, comprising:

one or more processors; and non-transitory computer-readable storage media encoding instructions which, when executed by the one or more processors, causes the computer system to create:

a tactics, techniques, and procedures library engine that provides information about security vulnerabilities to generate the security information, wherein the tactics, techniques, and procedures library engine automatically accesses the security vulnerabilities from a third party through execution of an Application Programming Interface call and stores the security vulnerabilities in a tactics, techniques, and procedures database;

a dashboard engine programmed to generate a dashboard with the security information thereon, wherein the dashboard engine tailors the security information based upon a role of a user to provide the security information and wherein the dashboard engine allows the user to drill down on the security information;

a remediation engine programmed to track remediation of one or more of the security vulnerabilities;

an extraction engine programmed to query the tactics, techniques, and procedures database to extract data for inclusion in a report, wherein the extraction engine uses database query constructs to extract data based on a type of the security vulnerabilities and a line of business associated with the security vulnerabilities;

a report generator engine programmed to generate the report including the security information and the one or more of the security vulnerabilities, wherein dissemination of the report is controlled by document rights management limitations that include location-based and time-based limitations on access; and an administration engine programmed to manage access to the dashboard and the report, wherein the administration engine is further programmed to automatically revoke credentials when individuals move to other responsibilities and to log activity associated with access to reports for auditing purposes.

2. The computer system of claim 1, wherein the dashboard includes a list of the one or more of the security vulnerabilities and a heat map of the one or more of the security vulnerabilities.

3. The computer system of claim 1, wherein the report generator engine limits an ability of the report to be shared.

4. The computer system of claim 1, further comprising instructions which, when executed by the one or more processors, causes the computer system to create a workbench engine programmed to manage a security assessment of an entity.

5. A method for capturing security information, comprising:

providing information about security vulnerabilities to generate the security information by automatically accessing the security vulnerabilities from a third party through execution of an Application Programming Interface call and storing the security vulnerabilities in a tactics, techniques, and procedures database;

generating a dashboard with the security information thereon, wherein the dashboard tailors the security information based upon a role of a user to provide the security information and wherein the dashboard allows the user to drill down on the security information;

tracking remediation of one or more of the security vulnerabilities;

querying the tactics, techniques, and procedures database to extract data for inclusion in a report, wherein database query constructs are used to extract data based on a type of the security vulnerabilities and a line of business associated with the security vulnerabilities;

generating the report including the security information and the one or more of the security vulnerabilities, wherein dissemination of the report is controlled by document rights management limitations that include location-based and time-based limitations on access; and managing access to the dashboard and the report by automatically revoking credentials when individuals move to other responsibilities and logging activity associated with access to reports for auditing purposes.

6. The method of claim 5, wherein the dashboard includes a list of the one or more of the security vulnerabilities and a heat map of the one or more of the security vulnerabilities.

7. The method of claim 5, further comprising limiting an ability of the report to be shared.

8. The method of claim 5, further comprising managing a security assessment of an entity.

* * * * *